United States Patent Office 3,484,199
Patented Dec. 16, 1969

3,484,199
PROCESS FOR THE PRODUCTION OF COMPOUNDS CONTAINING PEROXY GROUPS AND PRODUCTS DERIVED FROM SUCH COMPOUNDS
Edwin George Edward Hawkins, Lower Kingswood, Surrey, England, assignor to The Distillers Company Limited, Edinburgh, Scotland, a British company
No Drawing. Filed Oct. 31, 1966, Ser. No. 590,520
Claims priority, application Great Britain, Nov. 20, 1965, 49,401/65
Int. Cl. C01b 15/02
U.S. Cl. 23—207                                   15 Claims

ABSTRACT OF THE DISCLOSURE

Hydrogen peroxide produced by auto-oxidation of a cycloalkanol is extracted from the reaction mixture thus obtained with an aqueous solution of an acid or base. The cycloalkanone remaining in the reaction mixture after the extraction of the hydrogen peroxide may be distilled off and reacted with the extracted hydrogen peroxide to give cycloalkanone peroxides.

---

The present invention relates to a process for the production of hydrogen peroxide, and to a particularly advantageous method of utilising the hydrogen peroxide obtained.

It is known that hydrogen peroxide may be obtained by the oxygenation of secondary alcohols. The main methods suggested for separating hydrogen peroxide from the secondary alcohol have been distillation and precipitation of insoluble inorganic peroxides.

Accordingly, the present invention is a process for the production of hydrogen peroxide which comprises autoxidising a cycloalkanol to give peroxides and extracting the reaction mixture with an aqueous solution of an acid or base. The cycloalkanols which may be used include cyclopentanol, cyclohexanol, cycloheptanol, cyclooctanol, but the preferred cycloalkanol is cyclohexanol.

The cycloalkanol may be oxidised to peroxidic compounds by any of the known methods used for oxidising cyclic alkanols to peroxidic compounds. Thus oxidation by oxygen containing gases at elevated temperatures, e.g. 100–130° C. may be used. The cycloalkanol is maintained in the liquid phase and an initiator, e.g. a small quantity of the peroxidic material formed in the oxidation reaction is preferably added. Other substances may be added to improve the yield and stability of perioxidic material, e.g. solid calcium carbonate.

The duration of the reaction will depend on the temperature, stirring and the rate at which oxygen is passed into the reaction mixture and the degree of conversion to peroxidic material required, and may be determined by simple tests.

"Peroxidic material" for the purposes of this specification may be defined as compounds liberating iodine from acidified potassium iodide, the iodine being titratable with sodium thiosulphate.

The hydrogen peroxide may be extracted from the cycloalkanol oxidation product by one or more batch or continuous extractions, and if the aqueous extract of hydrogen peroxide is too dilute it may be contacted with further quantities of fresh reaction mixture until the concentration of hydrogen peroxide has risen to a more useful level. The acid or alkali and hydrogen peroxide in the aqueous extract will not have any deleterious effect when used to extract fresh quantities of reaction mixture.

An aqueous solution of an acid or base is used to extract hydrogen peroxide because the use of water alone leads to very much less efficient extraction of the hydrogen peroxide. The solutions of acids and alkalis used may be quite dilute, and are preferably in the range 0.1 to 10% by weight. Higher concentrations of acid and base may be used, though there is no advantage in using higher concentrations. High concentrations of strong acids are however preferably avoided as such high contrations may lead to side reactions causing loss of hydrogen peroxide. A particularly preferred range of concentrations is 0.25 to 8% by weight of acid or base. A suitable concentration is 1% by weight. The acids and bases should preferably be of approximately the same order of strength as phosphoric, sulphuric, hydrochloric acids and alkali metal hydroxides e.g. sodium and potassium hydroxide, though weaker acids and bases, e.g. pyridine and acetic acid may be used.

The cycloalkanol will tend to dissolve in the aqueous extract, and to reduce the loss of the cycloalkanol in the aqueous extract the reaction product containing the peroxidic material may be mixed with a suitable inert organic solvent before being contacted with the aqueous extraction medium. Suitable solvents included benzene, petrol i.e. a light petroleum distillate (e.g. a distillate boiling in the range 40 to 80° C. at atmospheric pressure), carbon tetrachloride, methylene dichloride. Instead of adding the inert organic solvent before extraction with the aqueous medium, the aqueous extract may itself be extracted with the inert solvent to remove any dissolved cycloalkanone and cycloalkanol.

In the oxidation of cycloalkanols to peroxides the proportion of cycloalkanol converted to peroxidic material during oxidation rises to a maximum and then usually falls. The maximum conversion attained is usually about 10 mole percent, and by operating at the maximum possible conversion the quantity of cycloalkanol recycled can be reduced. We have found however that when the cycloalkanol is autoxidised all the peroxide initially formed is extractable as hydrogen peroxide by dilute aqueous solutions of acids or alkalis, but as the reaction proceeds, and more cycloalkanol is converted to peroxides, a different type of peroxidic material is formed which is not extracted by dilute aqueous acids or alkalis, i.e. it is a peroxide which does not liberate $H_2O_2$ under these conditions. The first type of peroxidic material may be estimated by titration with ceric ammonium sulphate while the second type of peroxidic material may be estimated by titration with acidified potassium iodide but not with ceric ammonium sulphate.

If the course of the reaction is followed by titration with both ceric ammonium sulphate and potassium iodide the onset of the production of the non-extractable peroxides is indicated by the values of peroxide concentration given by the two methods beginning to diverge. The degree of conversion of the cycloalkanol at which this divergence begins is usually in the range of from 3 to 5 mole percent though it is possible to keep the two values of peroxide concentration together till higher degrees of conversion are reached by the use of special methods of working e.g. by starting the reaction at one temperature and continuing it at a lower temperature. Thus it was found that by starting the oxidation reaction at a temperature of 120–125° C. and then continuing it at 100–110° C. a degree of conversion of 7 mole percent could be reached before the values for peroxide concentration given by the two methods referred to above began to diverge. The significance of this discovery is that by restricting the degree of conversion substantially all the peroxidic material can be removed from the cycloalkanol/cycloalkanone mixture before it is worked up further to separate cycloalkanol and cycloalkanone. This is preferable for safety reasons. The presence of the non-extractable peroxides also means that some of the cycloalkanol when oxidised does not yield the valuable products hydrogen peroxide and cycloalkanone.

The present invention may be used to prepare cycloalkanone peroxides free from any substantial amount of cycloalkanol by distilling off the cycloalkanone left in the autoxidation reaction mixture after the hydrogen peroxide has been extracted. For each mole of hydrogen peroxide extracted a mole of cycloalkanone will be left behind in the reaction mixture, and the cycloalkanone can then, after being separated from the cycloalkanol, be brought into contact with the aqueous extract of hydrogen peroxide to produce a precipitate of solid cyclohexanone peroxide.

The solid precipitate of cyclohexanone peroxide can be produced using very dilute solutions of hydrogen peroxide, the lowest concentration which can be used being 1–2% by weight. The cyclohexanone peroxide can therefore be produced without the need for expensive concentration of the hydrogen peroxide.

The present invention may also be used in the preparation of $\omega$-acyloxyalkane carboxylic acids by reacting the cycloalkanone obtained from the extracted reaction mixture, with a carboxylic acid and the hydrogen peroxide extracted from the reaction mixture. The aqueous extract of hydrogen peroxide may be concentrated if necessary, before being reacted with the carboxylic acid and the cycloalkanone. The cyclic alkanols which may be used in the preparation of the cycloalkanone and hydrogen peroxide include the lower cyclic alkanols e.g. cyclopentanol, cyclohexanol, cycloheptanol, but the preferred cycloalkanol is cyclohexanol. Suitable carboxylic acids include formic and acetic acids.

The invention will now be illustrated by the following examples.

EXAMPLE 1

Cyclohexanol (250 cc.), containing 1-hydroxy-1′-hydroperoxy-dicyclohexyl peroxide (0.5 g.) (as initiator) and suspended calcium carbonate (3.5 g.), was oxidised with $O_2$ at 120–125° C. for 70 minutes: 1.7 litres of oxygen had reacted. Two samples, each of 0.5 cc., of this oxidate gave a titration of 2.22 cc. 10 N sodium thiosulphate solution (after heating with saturated potassium iodide solution and acetic acid), and a titration of 2.15 cc. 10 N ceric ammonium sulphate solution respectively. The oxidate was cooled and filtered and two portions of 20 cc. were each dissolved in benzene (40 cc.); one portion was extracted with 1% w./v. aqueous sulphuric acid (3×80 cc.) and the other portion extracted with 1% w./v. aqueous sulphuric acid (3×20 cc.) to yield extracts containing 0.0041 and 0.0042 mole respectively of hydrogen peroxide (by titration with ceric ammonium sulphate). The calculated amount of extractable hydrogen peroxide (based on the titration of the original oxidate)=0.0043 mole per 20 cc. portion.

1% w./v. aqueous sulphuric acid (100 cc.) was used to extract successively portions (5×40 cc.) of the above oxidate, each portion being dissolved in benzene (80 cc.). The final aqueous phase contained 0.031 mole of hydrogen peroxide, i.e. 75% of the total extractable hydrogen peroxide in these portions was removed by the use of one batch of extracting solution.

EXAMPLE 2

Cyclohexanol was oxidised as in Example 1; after 2 hr. at 120–125° (bath), 0.5 cc. samples gave titrations of 5.0 cc. 10 N sodium thiosulphate and 4.45 cc. 10 N ceric ammonium sulphate as described above: 2.5 litres of oxygen had been absorbed.

Portions of this oxidate (each 20 cc.) were dissolved in benzene (40 cc.) and extracted with various aqueous solutions. The solutions used and hydrogen peroxide extracted are given below:

(i) 1% w./v. aqueous sulphuric acid (3×80 cc.); 0.00837 mole $H_2O_2$
(ii) 1% w./v. aqueous pyridine (3×80 cc.); 0.00795 mole $H_2O_2$
(iii) Water (3×80 cc.); 0.00727 mole $H_2O_2$
(iv) 1% w./v. aqueous acetic acid (3×80 cc.); 0.00774 mole $H_2O_2$ Calculated quantity of peroxide titratable with ceric ammonium sulphate in the original 20 cc. portion of oxidate is equivalent to about 0.0089 mole $H_2O_2$.

EXAMPLE 3

Cyclohexanol was oxidised as in Example 1; after 3 hours at 120–125° C. 0.5 cc. samples gave titrations of 5.1 cc. 10 N sodium thiosulphate and 4.2 cc. 10 N ceric ammonium sulphate (as above).

Portions of this oxidate (each 20 cc.) were dissolved in benzene (40 cc.) and extracted as below:

(i) 1% w./v. aqueous sulphuric acid (3×20 cc.); 0.0079 mole $H_2O_2$
(ii) 5% w./v. aqueous sulphuric acid (3×20 cc.); (1×100 cc.) 0.0081 mole $H_2O_2$
(iii) 1% w./v. aqueous phosphoric acid (3×20 cc.); 0.00793 mole $H_2O_2$
(iv) 1% w./v. aqueous phosphoric acid (3×20 cc.) at 40°; 0.00811 mole $H_2O_2$
(v) Water (4×20 cc.); 0.00595 mole $H_2O_2$
(vi) 1% w./v. sulphuric acid in 20% aqueous ethanol (3×24 cc.); 0.00814 mole $H_2O_2$ Calculated quantity of peroxide titratable with ceric ammonium sulphate in the original 20 cc. portion of oxidate is equivalent to about 0.0084 mole $H_2O_2$.

(vii) Oxidate (20 cc.) was extracted with 5% aqueous sulphuric acid (50 cc.) and this aqueous extract washed benzene (3×20 cc.); the benzene washings were combined and re-extracted with 5% sulphuric acid (20 cc.). The combined aqueous acid extract contained 0.0084 mole $H_2O_2$.
(viii) Oxidate (20 cc.) was extracted with 5% aqueous sulphuric acid (3×40 cc.) and the combined aqueous extract washed with benzene (3×20 cc.). The aqueous extracts contained 0.0083 mole $H_2O_2$.

EXAMPLE 4

For comparison of the use of different solvents 20 cc. portions of an autoxidate of cyclohexanol were used.

(i) Benzene (40 cc.); extracted by 1% w./v. sulphuric acid (3×20 cc.); 0.01023 mole $H_2O_2$
(ii) Benzene (80 cc.); extracted by 1% w./v. sulphuric acid (3×20 cc.); 0.00994 mole $H_2O_2$
(iii) Benzene (20 cc.); extracted by 1% w./v. sulphuric acid (4×20 cc.); 0.01010 mole $H_2O_2$
(iv) Petrol (B.P. 40–60°) (40 cc.) extracted by 1% w./v. sulphuric acid (3×20 cc.); 0.01028 mole $H_2O_2$
(v) Ethyl acetate (40 cc.) extracted by 1% w./v. sulphuric acid (3×20 cc.); 0.00938 mole $H_2O_2$
(vi) Methylene chloride (40 cc.) extracted by 1% w./v. sulphuric acid (3×20 cc.); 0.00886 mole $H_2O_2$
(vii) Chloroform (40 cc.) extracted by 1% w./v. sulphuric acid (3×20 cc.); 0.00965 mole $H_2O_2$

EXAMPLE 5

For comparison of the use of different solvents and extractants 20 cc. portions of an autoxidate of cyclohexanol in 40 cc. of solvent were used.

(i) Benzene; extracted by 1% sulphuric acid (3×20 cc.); 0.00686 mole $H_2O_2$
(ii) Petrol (B.P. 40–60°) extracted by 1% w./v. sulphuric acid (3×20 cc.); 0.0069 mole $H_2O_2$ (iii) Chloroform; extracted by 1% w./v. sulphuric acid (3×20 cc.) 0.0067 mole $H_2O_2$
(iv) Carbon tetrachloride; extracted by 1% w./v. sulphuric acid (3×20 cc.) 0.0066 mole $H_2O_2$
(v) Ethyl acetate; extracted by 1% w./v. sulphuric acid (3×20 cc.); 0.0054 mole $H_2O_2$
(vi) Benzene; extracted by 0.25% w./v. sulphuric acid (3×20 cc.); 0.0065 mole $H_2O_2$
(vii) Benzene; extracted by 8% w./v. sulphuric acid (3×20 cc.); 0.0067 mole $H_2O_2$
(viii) Benzene; extracted by 3% w./v. hydrochloric acid (3×20 cc.); 0.0069 mole $H_2O_2$
(ix) Benzene; extracted by 1% w./v. sodium hydroxide (3×20 cc.); 0.0067 mole $H_2O_2$

I claim:
1. In the process for the production of hydrogen peroxide by auto-oxidizing a cycloalkanol to give hydrogen peroxide the improvement which comprises extracting the hydrogen peroxide from the reaction mixture with a dilute aqueous solution containing at least 0.1 percent by weight of an acid or base.
2. A process according to claim 1 wherein the cycloalkanol contains from 5 to 8 carbon atoms in the ring.
3. A process according to claim 2 wherein the cycloalkanol is cyclohexanol.
4. A process according to claim 1 wherein an aqueous extract obtained by extracting the reaction mixture with the aqueous solution of an acid or base is brought into contact with further quantities of fresh mixture.
5. A process according to claim 2 wherein the reaction mixture is mixed with an inert organic solvent before being brought into contact with the aqueous solution of an acid or base.
6. A process according to claim 5 wherein the inert solvent is benzene, petrol, carbon tetrachloride or methylene dichloride.
7. A process according to claim 2 wherein the cycloalkanol is autoxidized so as to convert not more than 7 mole percent of the cycloalkanol to peroxides.
8. A process according to claim 7 wherein the autoxidation is initiated at a temperature of 120° to 125° C. and continued at a temperature of 100° to 110° C. to a conversion of not more than 7 mole percent.
9. A process according to claim 7 wherein not more than 5 mole percent of the cycloalkanol is converted to peroxides.
10. A process according to claim 3 wherein after hydrogen peroxide has been extracted from the reaction mixture, cycloalkanol remaining in the reaction mixture is distilled off and brought into contact with hydrogen peroxide, obtained by extraction of the reaction mixture, to give cycloalkanone peroxides.
11. A process according to claim 3 wherein hydrogen peroxide, obtained from the aqueous solution of the acid or base used to extract the cycloalkanol autoxidation reaction mixture, cycloalkanone, obtained from the cycloalkanol reaction mixture after extraction of the hydrogen peroxide, and formic acid are reacted together.
12. A process according to claim 1 wherein an aqueous solution of sulphuric, phosphoric or hydrochloric acids is used to extract the hydrogen peroxide.
13. A process according to claim 1 wherein an aqueous solution of alkali metal hydroxide is used to extract hydrogen peroxide.
14. A process according to claim 1 wherein the aqueous solution of an acid or base is a dilute solution.
15. A process according to claim 1 wherein the aqueous solution of an acid or base used to extract the reaction mixture obtained by autoxidation of the cycloalkanol contains from 0.1 to 10% by weight of the acid or base.

References Cited

UNITED STATES PATENTS 2,369,912 2/1945 Pfleiderer et al. 23—207
2,871,103 1/1959 Skinner et al. 23—207

FOREIGN PATENTS 1,144,240 2/1963 Germany.

OSCAR R. VERTIZ, Primary Examiner
H. S. MILLER, Assistant Examiner

U.S. Cl. X.R.
260—610

PO-1050
(5/69)

UNITED STATES PATENT OFFICE
CERTIFICATE OF CORRECTION

Patent No. 3,484,199          Dated  December 16, 1969

Inventor(s)  EDWIN GEORGE EDWARD HAWKINS

It is certified that error appears in the above-identified patent and that said Letters Patent are hereby corrected as shown below:

Column 5, line 18, after "peroxide" insert
--extractable with water--

SIGNED AND
SEALED
MAY 12 1970

(SEAL)
Attest:

Edward M. Fletcher, Jr.
Attesting Officer

WILLIAM E. SCHUYLER, JR.
Commissioner of Patents